(12) United States Patent
Mori et al.

(10) Patent No.: US 7,801,051 B2
(45) Date of Patent: Sep. 21, 2010

(54) NETWORK SYSTEM, NODE DEVICE AND MANAGEMENT SERVER

(75) Inventors: Takuro Mori, Hachioji (JP); Kazuma Yumoto, Fuchu (JP); Hitoshi Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 214 days.

(21) Appl. No.: 11/964,210

(22) Filed: Dec. 26, 2007

(65) Prior Publication Data

US 2008/0225731 A1    Sep. 18, 2008

(30) Foreign Application Priority Data

Mar. 14, 2007   (JP) .............................. 2007-064942

(51) Int. Cl.
   *H04J 3/14*   (2006.01)
   *G06F 11/00*   (2006.01)
(52) U.S. Cl. ....................................... 370/242; 370/252
(58) Field of Classification Search ........................ None
   See application file for complete search history.

(56) References Cited

U.S. PATENT DOCUMENTS

| | | | |
|---|---|---|---|
| 6,496,481 B1 * | 12/2002 | Wu et al. ...................... | 370/242 |
| 2005/0111371 A1 * | 5/2005 | Miura et al. ................. | 370/242 |
| 2006/0023720 A1 * | 2/2006 | Ido et al. ..................... | 370/394 |
| 2006/0041346 A1 * | 2/2006 | Sugo ........................... | 701/33 |
| 2008/0117834 A1 * | 5/2008 | Ohno et al. .................. | 370/252 |
| 2008/0205263 A1 * | 8/2008 | Cooley et al. ................ | 370/218 |

OTHER PUBLICATIONS

"Bidirectional Forwarding Detection"Katz, et al. Jun. 2006.

* cited by examiner

*Primary Examiner*—Min Jung
(74) *Attorney, Agent, or Firm*—Mattingly & Malur, P.C.

(57) ABSTRACT

Erroneous detection of a failure in spite of the absence of failure on the route on account of a communication delay is to be prevented. A node device detects a failure on the route to a remote node device is detected by a failure to receive a packet from the remote node device after the elapse of a determined detection time. The node device sets "remote system transmission interval×detection multiplier" to be a first detecting time on the basis of a packet transmission interval determined by negotiation with the remote node device. It also sets the sum of "remote system actual transmission interval ×detection multiplier" and "tolerable delay time" to be a second detecting time. The first detecting time and the second detecting time are compared, and what is longer is determined as the detecting time to be applied to actual operation.

18 Claims, 16 Drawing Sheets

FIG. 10

REQUIRED MARGIN TIME TABLE 760, 761

| | | KEY INFORMATION a | | | |
|---|---|---|---|---|---|
| | | a < A1 | A1≦a<A2 | A2≦a<A3 | ·· | An−1≦a<An |
| KEY INFORMATION b | b < B1 | T11 | T21 | T31 | ·· | Tn1 |
| | B1≦b<B2 | T12 | T22 | T32 | ·· | Tn2 |
| | B2≦b<B3 | T13 | T21 | T33 | ·· | Tn3 |
| | ·· | ·· | ·· | ·· | | ·· |
| | Bm−1≦b<Bm | T1m | T2m | T3m | ·· | Tnm |

NETWORK SYSTEM, NODE DEVICE AND MANAGEMENT SERVER

CLAIM OF PRIORITY

The present application claims priority from Japanese application JP 2007-064942 filed on Mar. 14, 2007, the content of which is hereby incorporated by reference into this application.

FIELD OF THE INVENTION

The present invention relates to a network system, a node device, and a management server, more particularly to a detection protocol for monitoring communication failure between node devices, and further to a network system, a node device, and a management server which correct the time of detection performed to prevent erroneous detection.

BACKGROUND OF THE INVENTION

The Internet Engineering Task Force (IETF) is working on standardization of Bidirectional Forwarding Detection (BFD) as a protocol, independent of the routing protocol, for detecting communication failure between node devices and on the next hop. BFD regularly transmits and receives packets between systems by using the User Datagram Protocol (UDP) and, when no packet is received for a certain length of time, it is assumed that some failure has occurred on the communication path (failure on the route). This length of time is predetermined, and will hereinafter be referred to as detection time. The detection time is calculated from the interval at which packets are transmitted and a detection multiplier which represents the minimum number of packets consecutively lost to make the losses regarded as a failure, and the equation by which it is figured is stated to be "the transmission interval×the detection multiplier" is prescribed in Bidirectional Forwarding Detection, draft-ietf-bfd-base-05, June, 2006 for instance.

SUMMARY OF THE INVENTION

The BFD Protocol, which is a protocol for detection, provides for the use, when packets are to be transmitted, of a value obtained by reducing the negotiated transmission interval by a specific rate as a measure to address communication delays of BFD packets. For instance, the actual transmission interval is prescribed to be 75% to 100% of the determined packet transmission interval. This decrement corresponds to the tolerance for the delay. If in accordance with the rule the transmission interval is assumed to be 50 milliseconds and the detection multiplier to be 1 for instance, the tolerance for the delay will be 5 to 12.5 milliseconds, and there is a problem that, if a communication delay beyond the tolerance occurs, the failure of the packet to arrive within the waiting time on the receiving side will cause a communication failure to be erroneously detected. As the tolerance for the delay corresponds to the packet transmission interval of the remote system in BFD, the shorter the transmission interval, the higher the probability of erroneously detecting a failure.

For instance, when a communication failure is detected, the protocol control function may switch over the route. Since route switch-over in Open Shortest Path First (OSPF) or Intermediate System-Intermediate System (IS-IS) imposes a heavy load, if switch-over is frequently caused to occur by erroneous detections, the performance of the system may deteriorate. Therefore, it is required to keep erroneous detections arising from delays to the practicable minimum.

One of the objects of the present invention, attempted in view of the problems noted above, is to provide a network system, a node device, and a management server capable of avoiding, even if the packet transmission interval from the remote device is short, erroneous detection of a delay as a communication failure if the delay is not longer than a required margin time, which is the reference value for tolerating a delay. Another object of the invention is to achieve stable network operation by restraining unnecessary switch-over to a detour route.

Still another object of the invention is to perform correction only when the uncorrected detection time is shorter than the required detection time (remote transmission time+required margin time) and thereby to restrain detection delays due to correction of the detection time.

According to an embodiment of the invention, correction is so accomplished with a detection time correcting device, for instance, to make the value of the detection time, which is the time during which a failure is detected when no packet is received from a remote node, not shorter than the sum of a remote actual transmission interval, which is the interval at which the remote node actually transmits packets, and a required margin time, which is the tolerable delay time. Even if a delay not longer the required margin time occurs in packet communication from the remote node, no failure is detected and if the margin time is sufficient to allow for a delay, no correction is made.

According to a first aspect of the present invention, a network system includes plural node devices, in which:

each of the node devices is provided with a detection part for detecting any failure on a route to an opposite node device;

the detection part of a first node device determines a packet transmission interval for detection by negotiation with an opposite second node device; receives a packet for detection transmitted from the second node device; and detects a failure on the route to the second node device by a failure to receive the packet from the second node device after the elapse of a determined detection time; and as the detection time, the detection part of the first node device figures out a first detection time based on the transmission interval of the packet determined by negotiation with the second node device, figures out a second detection time by adding a margin time, either preset or pre-calculated, to the transmission interval of the packets determined by negotiation or the predicted value of a real transmission interval at which the packets are actually transmitted, based on the transmission interval, and compares the first detection time and the second detection time and determines what has the longer value as the detection time to be applied to real operation.

According to a second aspect of the invention, the node device in the network system includes plural node devices, in which:

the node device has a detection part for detecting any failure on the route to a remote node device;

the detection part determines a packet transmission interval for detection by negotiation with the remote node device; receives a packet for detection transmitted from the remote node device; and detects a failure on the route to the remote node device by a failure to receive the packet from the remote node device after the elapse of a determined detection time;

the detection time is determined by the detection part, which figures out a first detection time based on the transmission interval of the packet determined by negotiation with the remote node device, figures out a second detection time by adding a margin time, either preset or pre-calculated, to the transmission interval of the packets determined by negotiation or the predicted value of a real transmission interval at which the packets are actually transmitted, based on the transmission interval; compares the first detection time and the second detection time and determines what has the longer value as the detection time to be applied to real operation.

According to a third aspect of the invention, the management server in a network system includes first and second node devices and a management server, in which the first node device determines as a detection time either a first detection time based on the transmission interval of packets for detection determined by negotiation with the second node device or a second detection time involving the addition of a margin time received from a management server to the transmission interval of the packets determined by negotiation or the predicted value of the real transmission interval at which the packets are actually transmitted, based on the transmission interval, and a failure on the route to the second node device is detected by a failure to receive the packet from the second node device after the elapse of the detection time, in which:

the management server has a table in which margin times are stored in advance correspondingly to connected load information on the first node device and connected load information on the second node device;

a notification that connection is to be established between the first node device and the second node device is received from the first node device;

connected load information on the first and second node devices is received from the respective devices;

the corresponding margin times are acquired by searching the table on the basis of connected load information received from the first and second node devices, and the margin times are transmitted to the first and second node devices; and the second detection time is figured out by the first and second node devices by using the margin times.

The invention can provide a network system, a node device, and a management server capable of avoiding, even if the packet transmission interval from the remote device is short, erroneous detection of a delay as a communication failure if the delay is not longer than the required margin time, which is the reference value for tolerating a delay. This enables stable network operation to be achieved by restraining unnecessary switch-over to a detour route.

The invention further has an advantage of restrain detection delays due to correction of the detection time by performing correction only when the uncorrected detection time is shorter than the required detection time (remote transmission time+required margin time).

BRIEF DESCRIPTION OF THE DRAWINGS

FIG. 10 shows one example of required margin time database table in this embodiment;

DETAILED DESCRIPTION OF THE PREFERRED EMBODIMENTS

1. System Configuration

Figure 1:
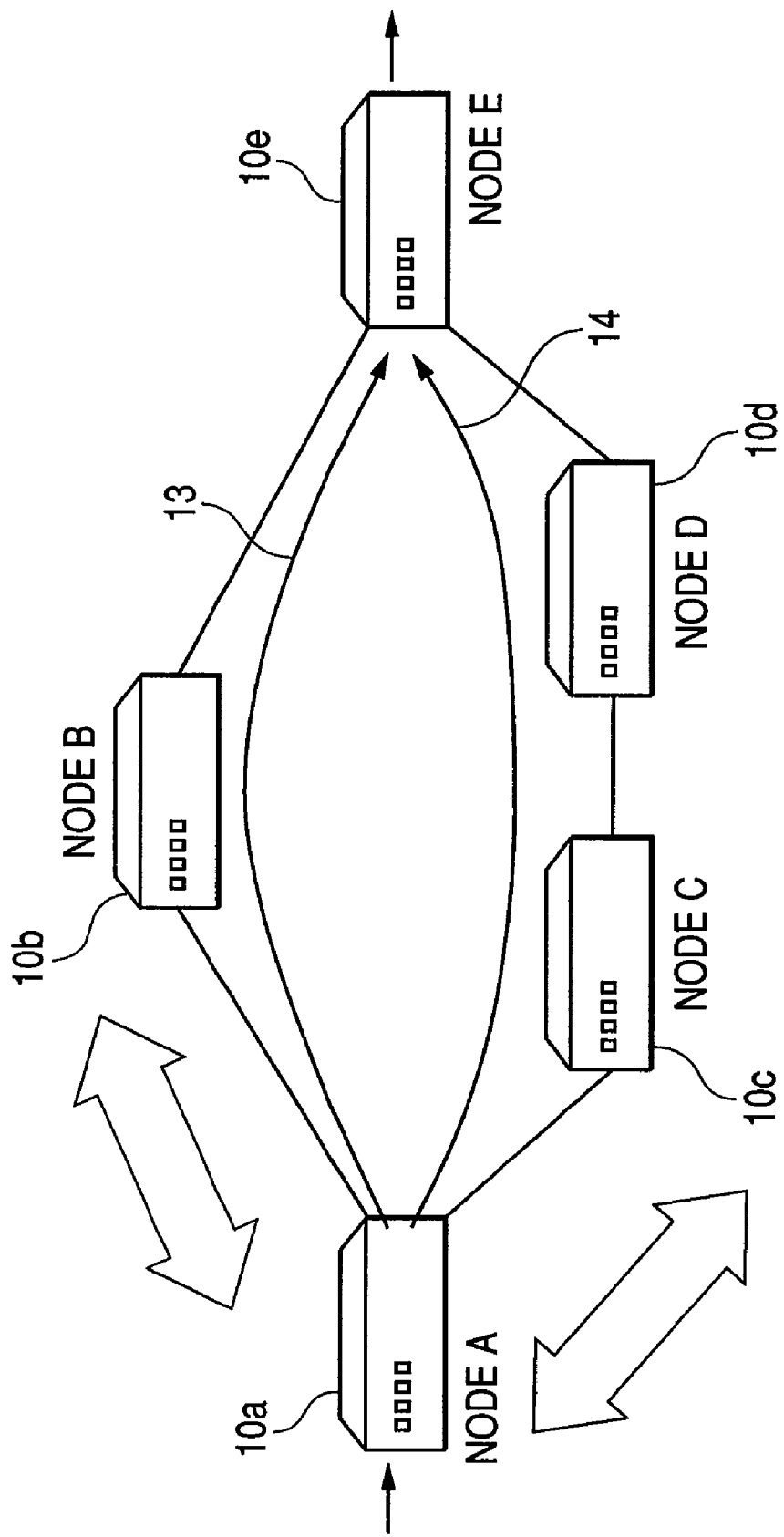
FIG. 1 shows an example of configuration of a communication failure detection system in one preferred embodiment of the invention.

FIG. 1 shows an example of configuration of a communication failure detection system in one preferred embodiment of the invention.

The communication failure detection system (network system) is provided with, for instance, a plurality of node devices s 10 (hereinafter referred to simply as nodes).

When there are a route 13 via a node B (10b) and a route 14 via a node C (10c) and a node D (10d) as communication paths between a node A (10a) and a node E (10e), the node A monitors failures between itself and the adjoining nodes (the node B and the node C) by using a communication detection protocol (e.g. BFD). For instance, when the route 13 is operated as the communication route between the node A and the node E by OSPF or IS-IS, or by static routing, and a communication failure is detected by the communication detection protocol monitoring between the node A and the node B, the communication detection protocol switches over the communication route to the route 14, which is an alternative route between the node A and the node E by notifying the failure to the route control part within the same node.

The failure in the context of this embodiment means a state in which, when the node A is to transmit a packet to the node E via the node B for instance, the packet fails to reach the node E. Therefore a state in which the packet reaches the destination though with some delay is not deemed to be a failure to be detected.

Figure 7:
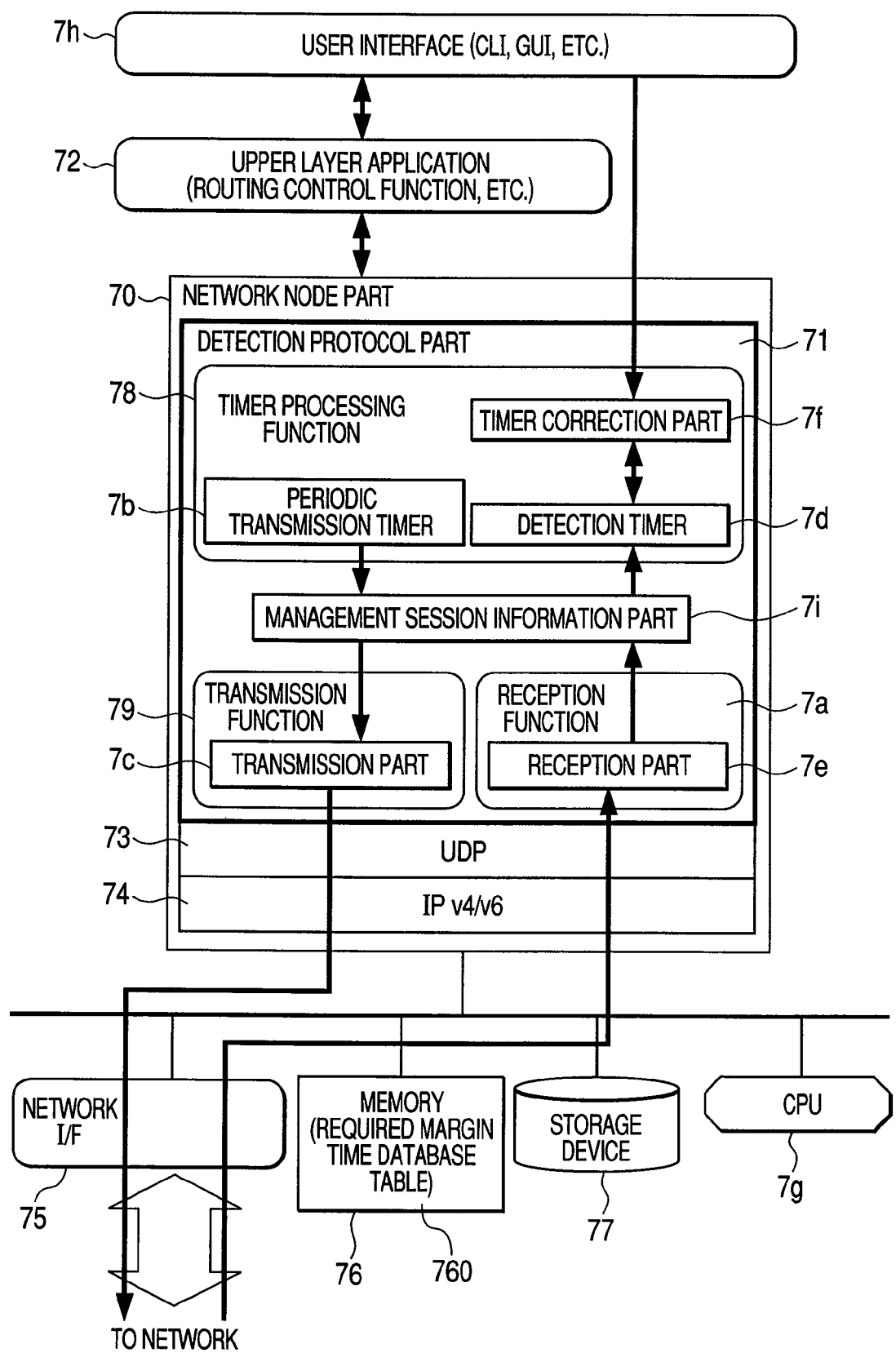
FIG. 7 is a hardware block diagram showing one example of configuration of a node device having a communication failure detecting function in this embodiment.

FIG. 7 is a hardware block diagram showing one example of configuration of a node device having a communication failure detecting function in this embodiment.

A node device has, for instance, a user interface 7h, an upper layer application (upper layer AP) 72, a network node part 70, a network I/F 75, a memory 76, a storage device 77, and a CPU 7g. The network node part 70 includes a detection protocol part 71, a UDP layer 73, and an IP layer 74.

The detection protocol part (detection part) 71 monitors any communication failure on the object communication path at a request from the upper layer application 72, which is a functional module performing route control or the like.

Where the detection protocol is BFD, the detection protocol itself is a protocol of or above the layer 3, and the structure is such that there are the UDP layer 73 and the IP layer 74 underneath. A periodic packet transmits and receives packets to and from a remote node physically via the network I/F 75. Where these functions are to be packaged as a software program, it loaded from the storage device 77 onto the memory 76 and executed by the CPU (7g).

The detection protocol part 71 has a timer processing function 78, a transmission function 79, a reception function 7a and a management session information part 7i.The timer processing function 78 has a periodic transmission timer 7b, a detection timer 7d,a timer correction part 7f.The transmission function 79 has a transmission part 7c,and the reception function 7a has a reception part 7e.Acquisition or updating of session information including that on negotiations with the remote node is processed by the management session information part 7i.When packets are to be periodically transmitted, the periodic transmission timer 7b provides a trigger, and the transmission part 7c generates packets on the basis of information from the management session information part 7i and transmits them.

When a failure is to be detected, the reception part 7e monitors the reception of packets, the detection timer 7d monitors the elapse of the detection time on the basis of information from the management session information part 7i. If there is no notification of packet reception from the reception part 7e until the detection time has elapsed, the occurrence of a failure is assumed, and the upper layer application 72 is so notified. Upon receiving the notification of a failure, the upper layer application 72 switches over the route for instance.

In this embodiment, the timer processing function 78 has the timer correction part 7f.The timer correction part 7f obtains the detection time from the detection timer 7d and, if any correction is needed, gives a feedback to the detection timer 7d.This serves to prevent erroneous detection of a failure due to a delay, which any existing mechanism can avoid. Where the user is to set the parameters of the timer correction part 7f,he or she can do so by operating the user interface 7h.

2.Detection

First, detection of a communication failure and problems will be described.

Figure 2:
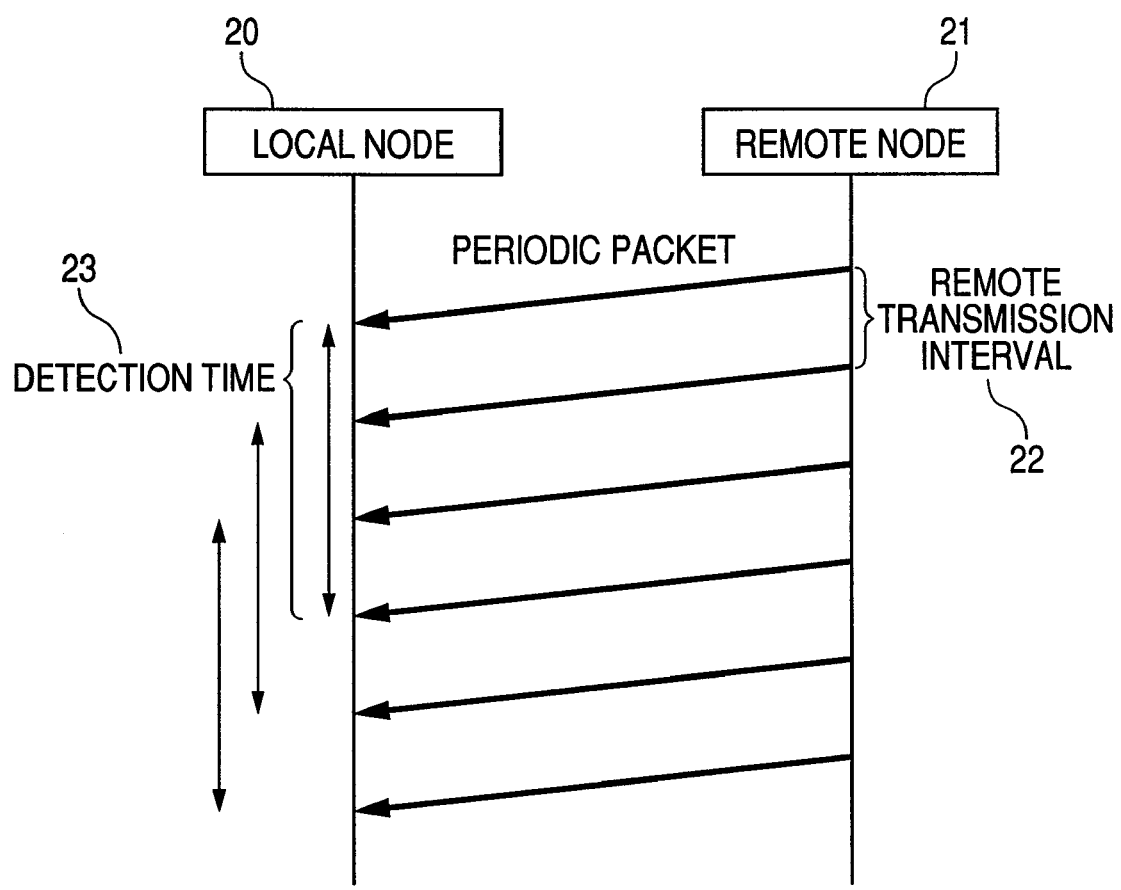
FIG. 2 is a sequence chart showing the failure monitoring mechanism of BFD.

FIG. 2 is a sequence chart showing the failure monitoring mechanism of Bidirectional Forwarding Detection (BFD).

The chart shows, with this device (e.g. the node A 10a) being assumed to be the local node (first node device) 20, packet transmission at constant intervals in monitoring the state of the route to the remote node (second node device or remote node device) 21 (e.g. the node B or the node C) and the monitoring time. Although communication pertaining only to failure monitoring in the local node 20 is shown in the chart, similar communication also takes place in the reverse direction as similar failure monitoring is actually performed in the remote node 21 as well.

Packets are periodically transmitted from the remote node 21. The interval 22 of packet transmission from the remote node 21 (remote transmission interval) is determined by negotiation at the time of session establishment. Since the procedure of negotiating the parameters including the packet transmission interval can conform to the BFD standards, its description is dispensed with here.

On the local node 20 side, packet reception from the remote node 21 is monitored in a detection time 23 which is another parameter similarly determined by negotiation at the time of session establishment. The detection time in BFD is determined by multiplying of the packet transmission interval 22 from the remote node 21 by the detection multiplier. When packets are received each within the detection time, the detection timer 7d is reset every time packet is received. When packets are received each within the detection time as show n in FIG. 2, the state is deemed to be normal.

Figure 3:
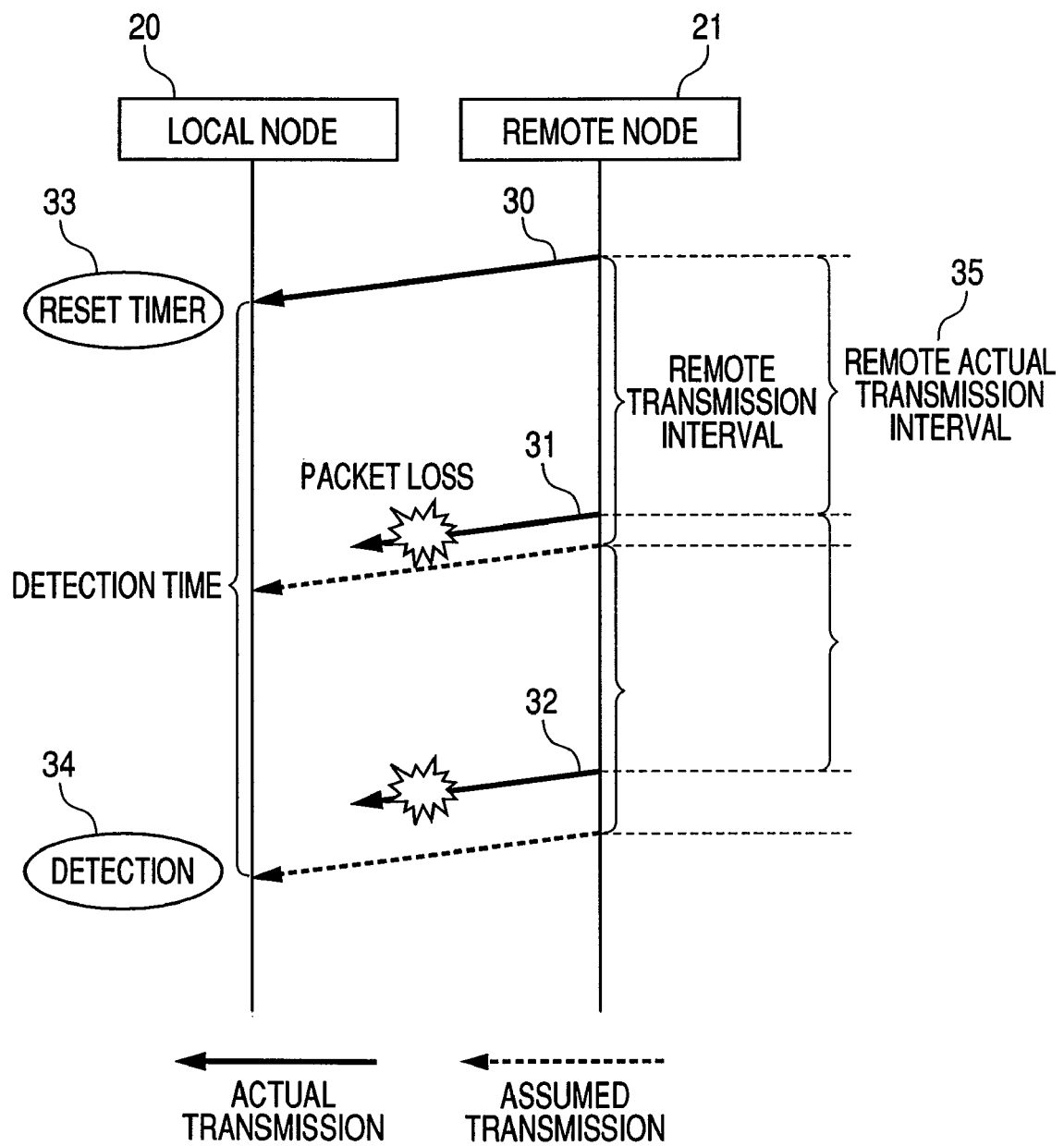
FIG. 3 is a sequence chart showing one example of failure occurrence due to packet loss in BFD.

FIG. 3 is a sequence chart showing one example of failure occurrence due to packet loss in BFD.

This chart shows a case in which the detection multiplier is 2; if two consecutive packets fail to be received within the detection time, the time runs out and the failure is detected.

In accordance with the provision of BFD, the remote node 21 makes a remote actual transmission interval (35), which is actually transmitted, shorter than the remote transmission interval determined by negotiation as an anti-delay measure to be taken when a packet is to be transmitted. The extent of interval reduction is, as prescribed by the protocol, 75 to 90% of the remote transmission interval when the detection multiplier is 1 or 75 to 100% of the remote transmission interval when the detection multiplier is 2.For instance, the remote actual transmission interval can be figured out by the applicable one of the following equations.

Where the detection multiplier is 1:

Actual transmission interval (35)=Transmission interval (22)×(75 to 90%)

Where the detection multiplier is 2:

Actual transmission interval (35)=Transmission interval (22)×(75 to 100%)

The value by which the transmission interval (22) is to be multiplied is varied at random at each time of transmitting a packet.

At the local node 20 having received a packet 30 transmitted from the remote node 21, the detection timer 7d is reset (Step 33). After that, if packets 31 and 32 from the remote node 21 fail to reach a local node 10, the detection timer 7d of the local node 20 runs out of time. Thus, if no packet at all reaches the remote node 21 within the detection time and the detection timer 7d runs out of time without being reset, the local node 20 assumes that a communication failure has arisen on the communication path between the two systems, and detects this as a failure (Step 34).

Figure 4:
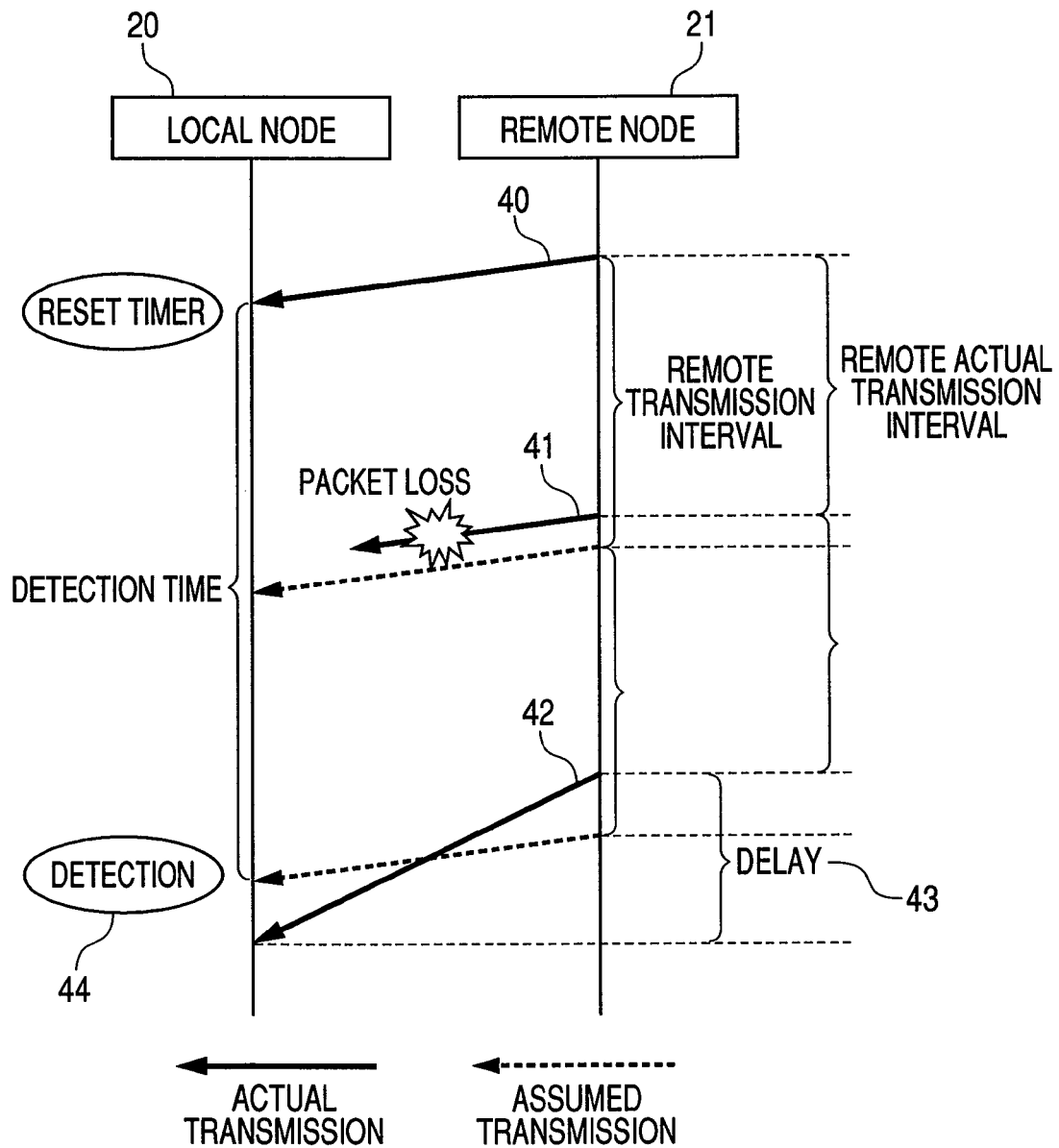
FIG. 4 is a sequence chart showing one example of failure occurrence due to communication delay in BFD.

FIG. 4 is a sequence chart showing one example of failure occurrence due to communication delay of a BFD packet. This chart, too, shows a case in which the detection multiplier is 2 as in FIG. 3. The difference from FIG. 3 is that a packet 42 from the remote node 21, corresponding to the packet 32 in FIG. 3 delays and reaches the local node 20 after the elapse of the detection time. Thus, even if the number of packet losses is thus 1,smaller than the value of the detection multiplier (2 in this case), both of the packets are deemed to have failed to arrive within the detection time depending on the length of a delay 43, the non-arrival is detected as a failure (Step 44).

The smaller the detection multiplier, the higher the frequency of occurrence of such failures (the number of erroneous detections). In an extreme case where the detection multiplier is 1,even if the communication path itself is active and no packet loss has occurred at all, a communication delay may be detected as a failure. Further, since the remote actual transmission interval 35 of the remote node is given by multiplying the remote transmission interval 22, the shorter the transmission interval of the packet, the shorter the tolerated delay time. As the communication delay time generally is not proportional to the transmission interval, this anti-delay measure is inadequate especially where the packet transmission interval is short.

Figure 5:
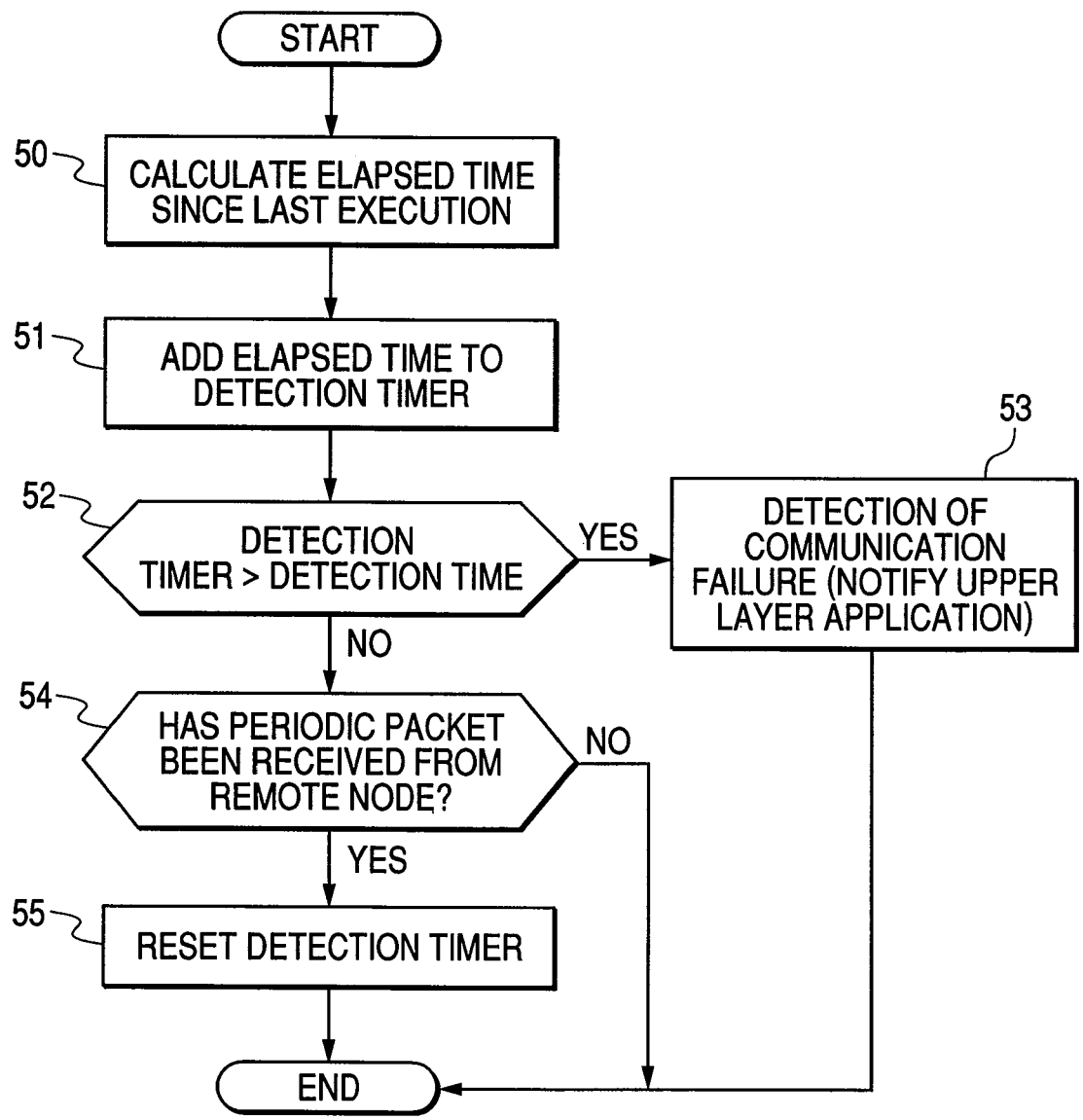
FIG. 5 is a flow chart showing one example of processing to accomplish detection.

FIG. 5 is a flow chart showing one example of processing to accomplish detection.

For instance, the following processing is executed repeatedly. Incidentally, the processing shown in this flow chart can be executed by each node, such as the node A 10a. The detection timer (7d) shown here is the timer for a detection which is started when the session is produced.

The local node 20, when checking connectability to the remote node 21, first calculates the elapsed time since last execution (Step 50), updates the count of the detection timer 7d by adding the calculated value to the detection timer 7d, and records the time during which no packet was received (Step 51). Incidentally, timer processing may be accomplished in any appropriate way. The local node 20 compares the updated count of the detection timer 7d with a predetermined detection time (Step 52); if the count of the detection timer 7d is longer than the predetermined detection time, detects a failure in connectability with the remote node 21, and notifies the failure to the upper layer application 72 which performs routing control and the like (Step 53). On the other hand, if the detection time has not yet elapsed (Step 50), the local node 20 checks whether or not any packet from the remote node has been received (Step 54). If any packet has been received, the local node 20 assumes the absence of a failure and resets the detection timer 7d (Step 55). If no packet has been received, it ends the processing and waits for the next round of processing.

The processing charted in FIG. 5 is repeatedly executed, for instance, at regular intervals of time and triggered by reception of a packet from the remote node.

3. Setting of Detection Time

Figure 6:
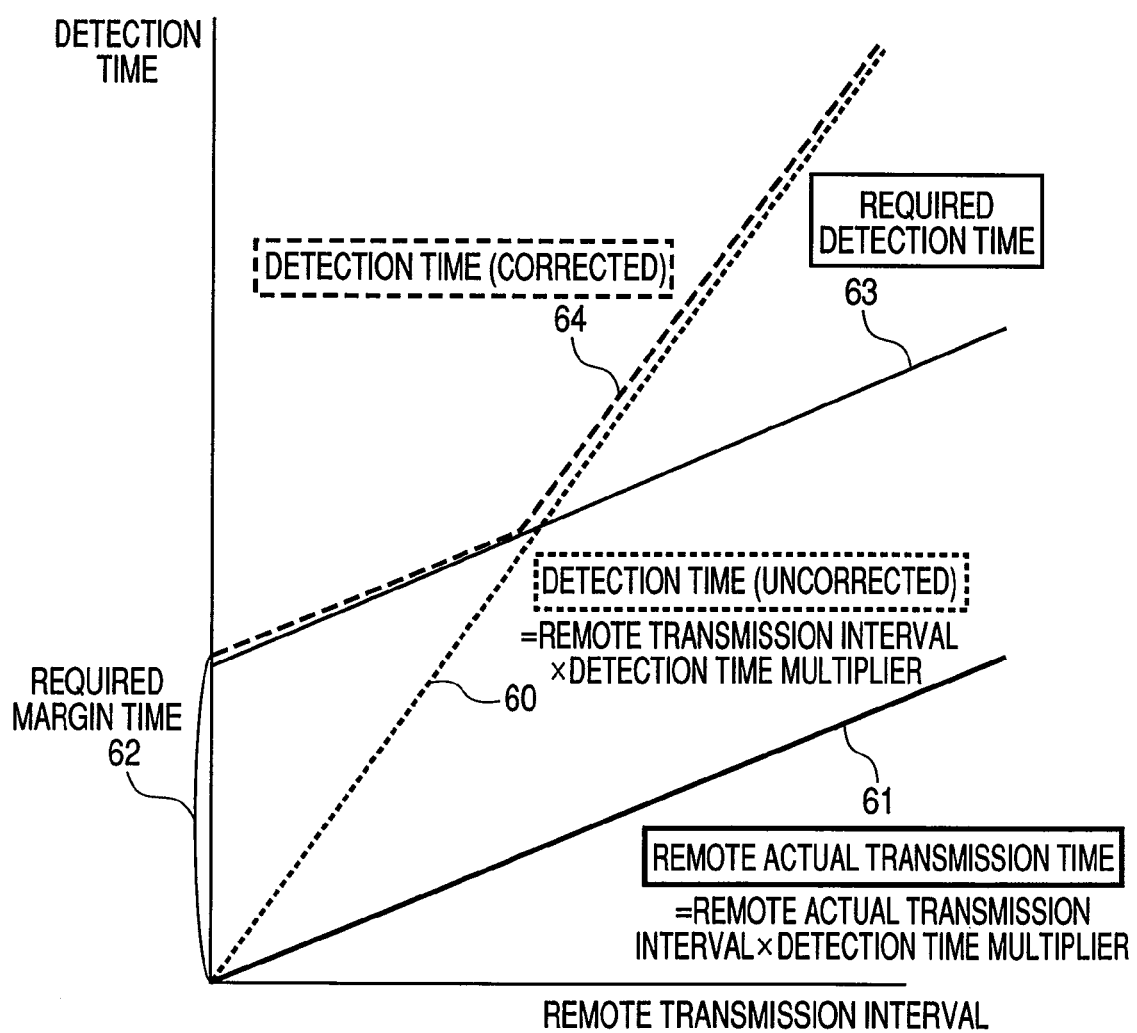
FIG. 6 is a graph showing the detection time correcting formula in this embodiment.

FIG. 6 is a graph showing the detection time correcting formula in this embodiment.

This is a detection time correcting formula for avoiding erroneous failure detection due to a delay in transmission though no packet is lost as at Step 42 in FIG. 4.

When packets from the remote node have been consecutively lost, a time 60 until detection of any failure is the remote transmission interval 22×the detection multiplier according to the conventional method. A remote actual transmission time 61 required by the remote node to actually transmit an equal number of packets to the detection multiplier is the remote actual transmission interval 35×the detection multiplier. Incidentally, the remote actual transmission interval 35 derives from multiplying the remote transmission interval by 75 to 100% as stated above, and is shorter than the remote transmission interval.

According to this formula, a required margin time 62 is set and a required detection time 63, which does not allow erroneous detection even if a delay by up to the required margin time 62 arises in the time required for packet communication from the remote node, is given by "the remote actual transmission time 61+the required margin time 62". As a new (corrected) detection time 64, the detection time 60 or the required detection time 63, whichever is longer, is adopted.

Regarding the remote actual transmission interval 35, it is not known at the local node at which rate within the prescribed range the remote node shortens the transmission interval from time to time. Therefore, the remote actual transmission interval 35 to be used when the remote actual transmission time 61 is to be figured out is calculated at the local node in the following way. When the detection multiplier is 1, 90% of the remote transmission interval 22 notified from the remote node is used as the assumed value of the remote actual transmission interval, or when the detection multiplier is 2, 100% of the remote transmission interval 22 is used as the assumed value of the remote actual transmission interval.

Thus, correcting operation is performed for an assumed case in which the effect of the provision introduced as the anti-delay measure is the weakest. Incidentally, some other appropriate assumed value may be used as well.

Regarding the method of calculating the required margin time mentioned above will be described with reference to FIG. 11 and subsequent drawings.

Figure 8:
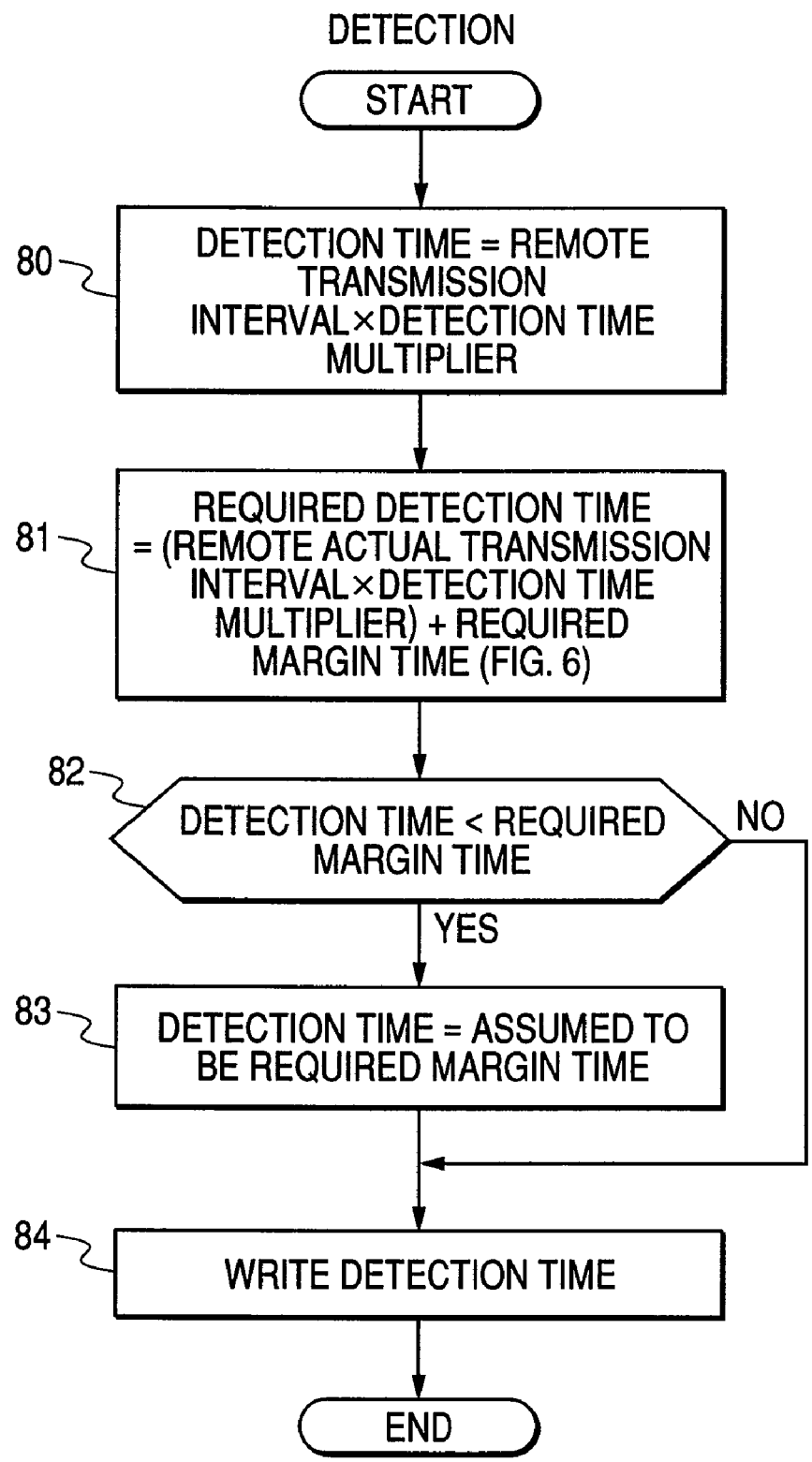
FIG. 8 is a flow chart showing one example of formula of applying the required margin time in this embodiment.

FIG. 8 is a flow chart showing one example of application of the required margin time in this embodiment.

In advance of this flow, the node device acquires by negotiation with the remote node device the remote transmission interval and the detection multiplier, which are stored in a memory as appropriate. Further, on the basis of the remote transmission interval, an assumed value of the remote actual transmission interval may also be figured out in advance.

The timer processing function 78 (e.g. the timer correction part 7f) first calculates in accordance with the provision of the protocol the detection time (first detection time) by "the remote transmission interval×the detection multiplier" (Step 80). Next, the timer processing function 78 calculates the required detection time (second detection time) 63 by "the remote actual transmission interval×the detection multiplier+the required margin time" (Step 81). The required margin time may be preset or a value figured out by the processing to be described afterwards. The timer processing function 78 compares the conventional detection time calculated at Step 80 and the required detection time calculated at Step 81 (Step 82). The timer processing function 78, if the detection time is shorter than the required detection time (Step 82), sets the value of the required detection time as the detection time (Step 83). The timer processing function 78 writes the updated detection time (Step 82) into the storage area (the memory 76 or the storage device 77) of the system (Step 84).

When any parameter has been altered, for instance when the user alters the configurational definition or when the required margin time has varied as will be described afterwards, the required margin time may be updated to a suitable one by carrying out again the processing of FIG. 8.

As an example of correction, it is supposed here that the remote actual transmission interval 35 is 90% of the remote transmission interval 22 for an uncorrected detection time 60. When a required margin time of 10 milliseconds is to be secured, correction is needed where the detection time is not longer than 100 milliseconds. In a case easy to understand, where the detection multiplier is 1 and the remote transmission interval 22 is 50 milliseconds (namely the detection time s 50 milliseconds), the permissible relay time is 5 milliseconds, and therefore the required margin time will be less than 10 milliseconds. If this embodiment is applied, as the uncorrected detection time 60 is 50 milliseconds (Step 80), the required detection time is 55 milliseconds (Step 81), and the applicable detection time is 55 milliseconds (Steps 82 and 83), the difference of 10 milliseconds from the remote actual transmission interval of 45 milliseconds will be secured as the tolerable delay time.

Figure 9:
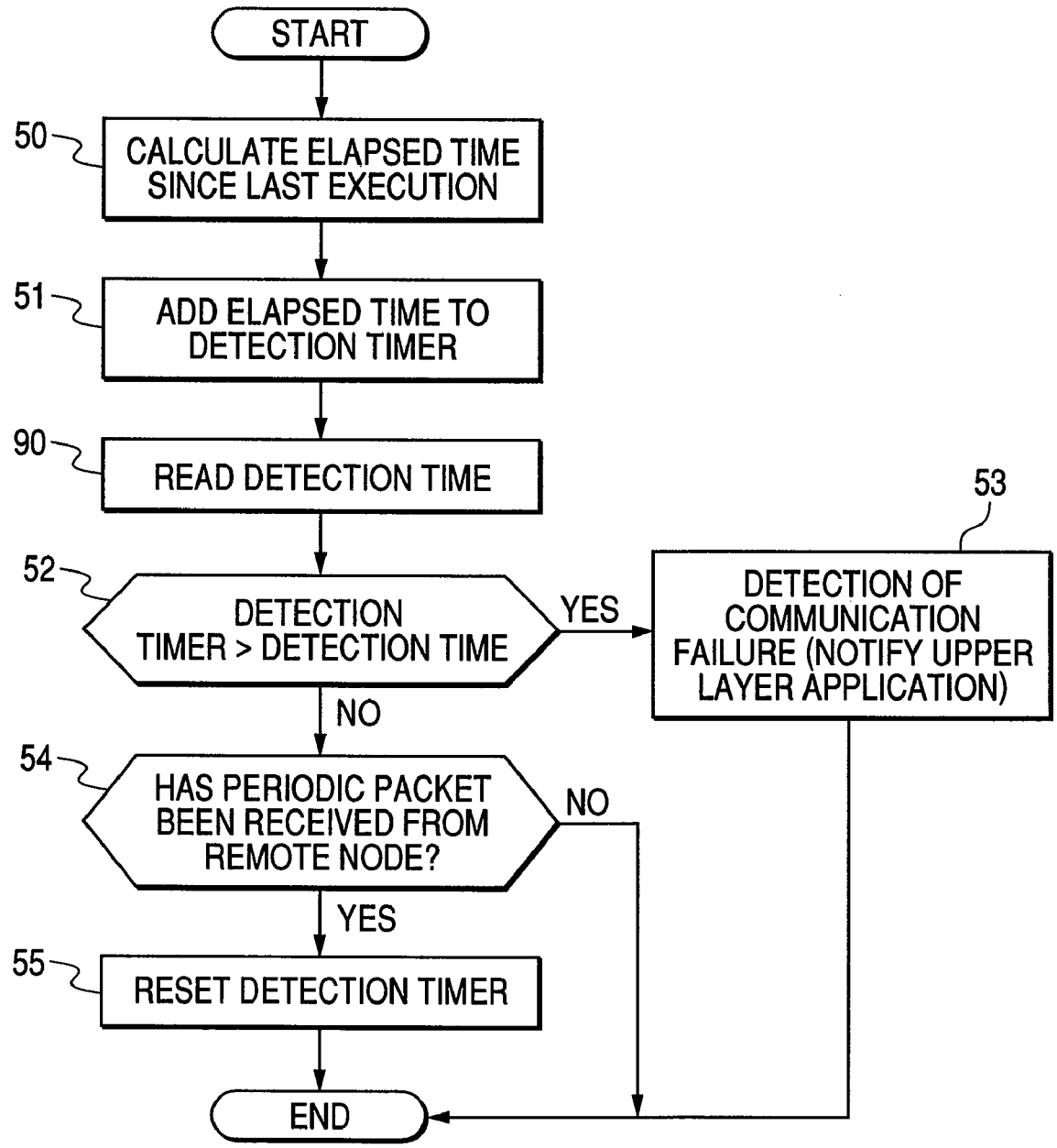
FIG. 9 is a flow chart showing one example of processing to accomplish detection in this embodiment.

FIG. 9 is a flow chart showing one example of processing to accomplish detection in this embodiment.

When failure monitoring is to be performed, the procedure of reading in the corrected detection time figured out by the procedure of FIG. 8 is added as Step 90 to the detection flow shown in FIG. 5. As other steps of processing are the same as their respective counterparts in FIG. 5, their description will be dispensed with. Incidentally, where a fixed detection time determined at the time of actuating the system or some other appropriate occasion is to be used, the flow of FIG. 5 may be used as well. In this case, the detection time can be updated as appropriate.

4. Determination of Required Margin Time

Four methods, first through fourth, proposed in connection with this embodiment will be described below as methods of determining the required margin time. Before describing the individual methods, a required margin time database table 760 for use in the three of the four methods, second through fourth, will be described.

FIG. 10 shows one example of the required margin time database table 760 or 761 in this embodiment.

In the required margin time database table 760 or 761, required margin times are stored in advance matching two key information items a and b, for instance.

The required margin time is searched for according to two kinds of information (100 and 102). What is to be used as key information will be determined in specific terms in describing each method. Values in the table can be set by the system manager or the like in advance of operation. The correlation between the column values is as follows. As A1 to An (101), which are values determining the index (a plurality of first thresholds), become greater, the required margin time also becomes greater. Similarly, as B1 to Bm (103), which also are values determining the index (a plurality of second thresholds) become greater, the required margin time also becomes greater.

The first method of determining the required margin time is a formula by which the required margin time is given in advance as a fixed value. The user (manager) designates the required margin time through setting of the configuration or otherwise, and it does not vary during the operation of the node system unless the setting of the configuration is not altered.

The second method of determination is to give a margin time for a delay due to a load within the hardware by measuring the load on the local node (processing load). The key information items a and b of the required margin time database table 760 here are the average and variance of loads, respectively. The node may have a load measuring part, for instance, in the detection protocol part 71 or elsewhere.

Figure 11:
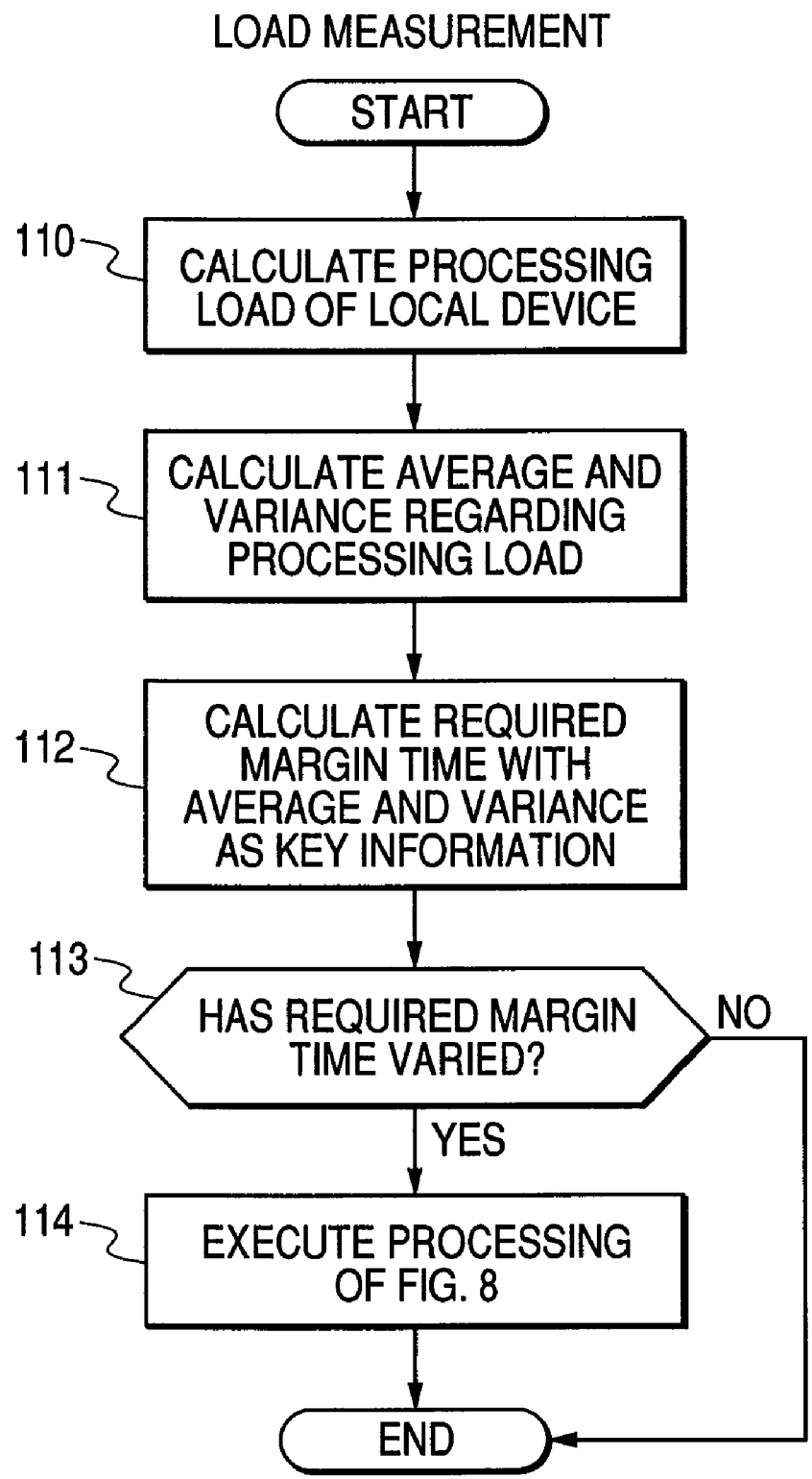
FIG. 11 is a flow chart showing one example of method of calculating the required margin time by using a load on the local device in this embodiment.

FIG. 11 is a flow chart showing one example of method of calculating the required margin time by using a load on the local device in this embodiment. The sequence of processing charted in FIG. 11 is accomplished by, for instance, the timer correction part 7*f*.

The local node 20 measures the difference between the actual period of execution and the set period of the processing part which periodically operates, such as the timer processing function 78, and loads in the local device, such as the CPU load (Step 110), and calculates the average of those values and changes relative to the time axis, such as the variance (Step 111). The local node 20 references the table 760 such as the one shown in FIG. 10 and figures out the corresponding required margin time (Step 112). As key information items (100 and 102) on that occasion, the average and variance of loads figured out at Step 111 are used. If the required margin time changes from its past value (e.g. the value figured out last time) (Step 113), the detection time is recalculated by performing the processing shown in FIG. 8 (Step 114). As the required margin time to be used at Step 81 then, the value figured out at Step 112 is used. The local node 20 may store into a memory or the like as appropriate the average and variance of loads figured out and the detection time.

The third method of determining the required margin time is to presume the delays arising at the remote node 21 and on the communication path by measuring the reception intervals (jitter) of packets from the remote node 21 and to give a margin time for them. The key information items a and b in the required margin time database table 760 here are, for instance, the average and variance of the reception intervals of packets. The node may have a reception interval measuring part, for instance, in the detection protocol part 71 or elsewhere.

Figure 12:
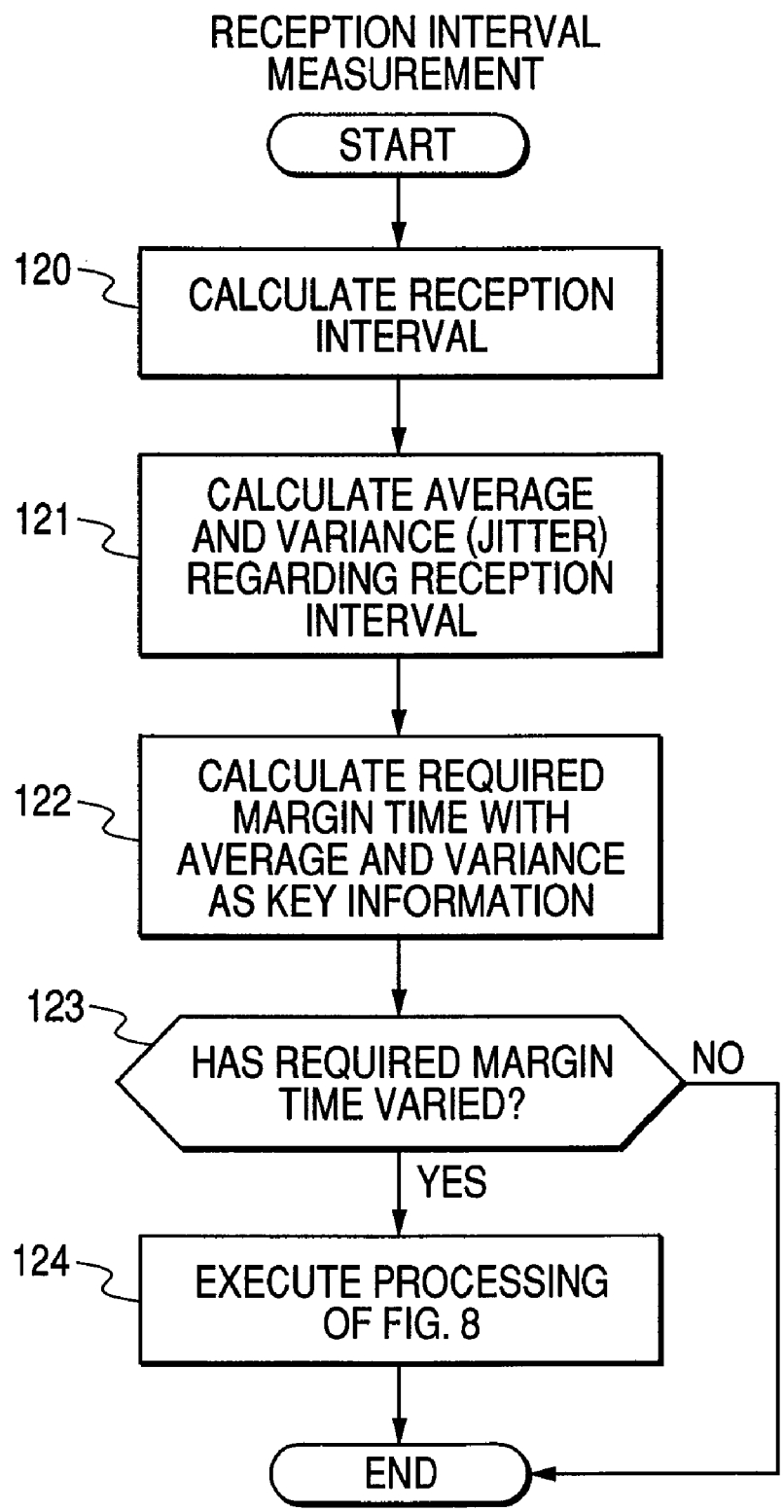
FIG. 12 is a flow chart showing one example of method of calculating the required margin time by using a jitter measuring formula in this embodiment.

FIG. 12 is a flow chart showing one example of method of calculating the required margin time by using a jitter measuring formula in this embodiment. The sequence of processing charted in FIG. 12 is accomplished by, for instance, the timer correction part 7*f*.

The local node 20, when it has received a packet from the remote node 21, calculates the time interval having elapses the last packet reception (Step 120), and calculates its change relative to the time axis (jitter), such as the average and variance of the value (Step 121). The required margin time is figured out by referencing the table 760, such as the one shown in FIG. 10 (Step 122). As the key information items (100 and 102) then, the values of the average and variance of the reception intervals figured out at Step 121 are used. When the required margin time has varied (Step 123), the detection time is recalculated by performing the processing shown in FIG. 8 (Step 124). As the required margin time to be used at Step 81 then, the value figured out at Step 122 is used. The local node 20 may store into a memory or the like as appropriate the average and variance of the reception intervals figured out and the detection time.

By analyzing the average value and the variance value by using distribution according to the second and third methods described above, the required margin time based on those loads and the probability of delay occurrence can be determined.

The fourth method of determining the required margin time is a method determined by a management server. This method will be described below.

Figure 13:
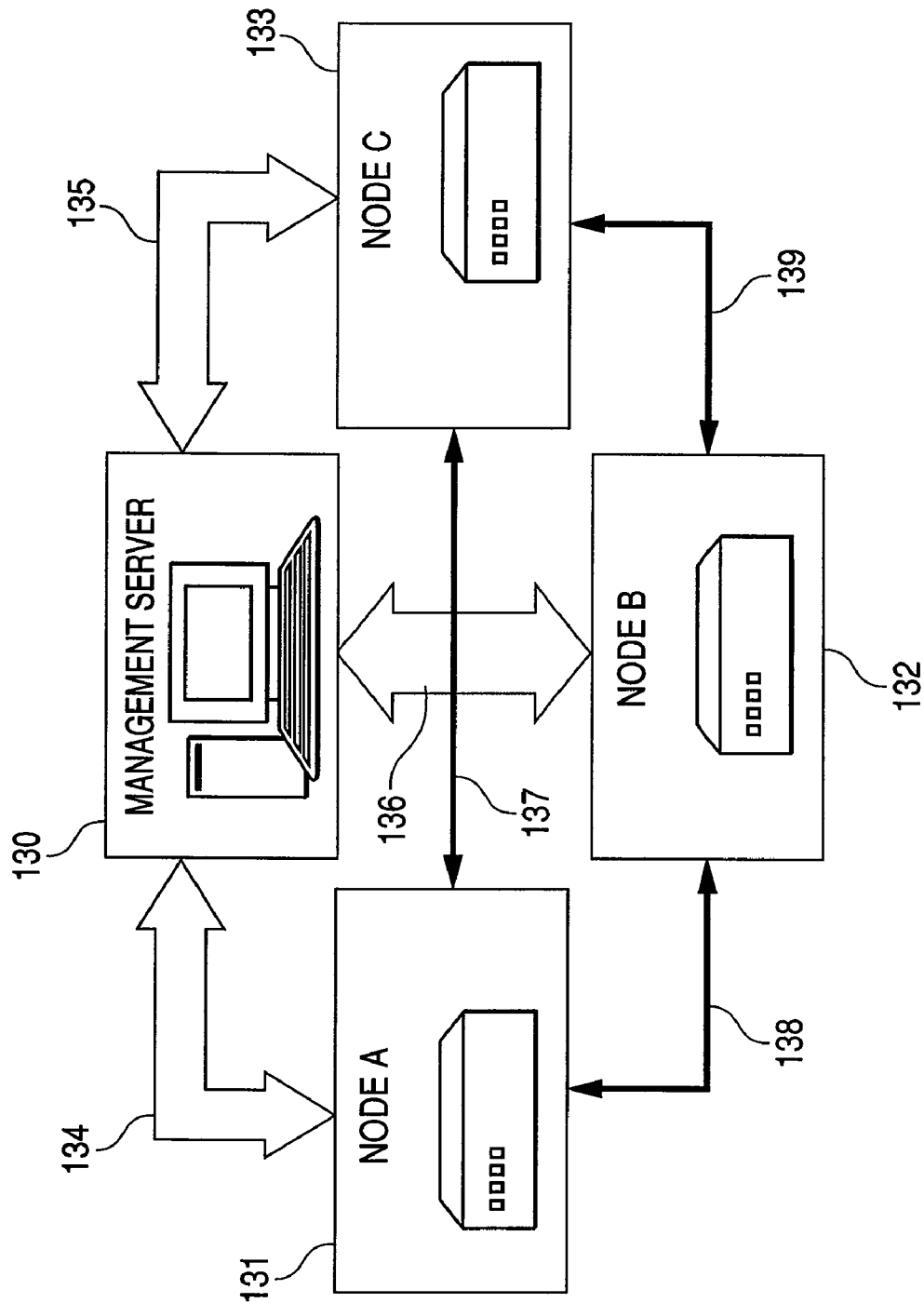
FIG. 13 shows one example of configuration of a communication failure detection system including a management server in this embodiment.

FIG. 13 shows one example of configuration of a communication failure detection system including a management server in this embodiment.

A management server 130 is connected to nodes 131, 132, and 133 via networks (134, 135, and 136). The nodes 131, 132, and 133 mutually monitor connectability via the networks (137, 138, and 139). The nodes 131, 132, and 133 respectively correspond to the nodes 10*a*,10*b*,and 10*c* in FIG. 1. The management server 130 keeps information on the connected state of each node. Each node requests the management server 130 for a required margin time before attempting connection to another node. The management server 130 calculates the required margin time of every node in compliance with the request, and notifies it to each node whose required margin time is variable. By using the management server 130, a required margin time taking into account the connection load of each node can be set.

Figure 15:
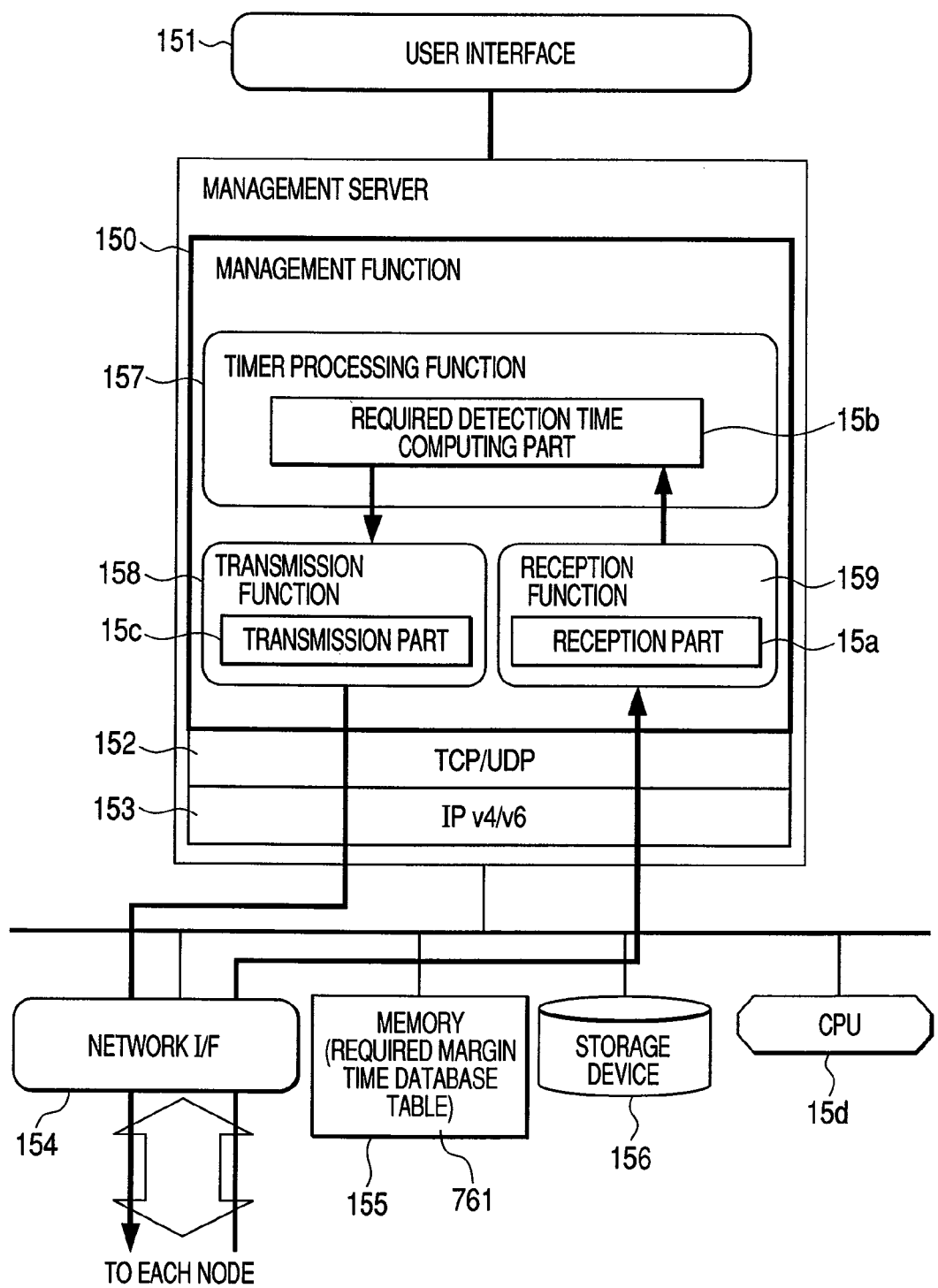
FIG. 15 is a hardware block diagram showing one example of configuration of the management server having a function to calculate the required margin time in this embodiment.

FIG. 15 is a hardware block diagram showing one example of configuration of the management server 130 having a function to calculate the required margin time in this embodiment.

The management server 130 has, for instance, a user interface 151, a management function 150, a network I/F 154, a memory 155, a storage device 156, and a CPU 15*d*. In the memory 155, for instance, the required margin time database table 761 is stored. The key information items a and b of the required margin time database table 761 here are the numbers of sessions of the nodes.

The management function 150 is enabled to obtain values for calculating the required margin time by setting from the user interface program 151 which accepts requests from the user, and presets them in the table 761. Underneath, there are a TCP/UDP layer 152 and an IP v4/v6 layer 153, which transmits and receives packets to and from the node system via the network interface 154. Information on each node device is recorded into the memory 155 and the storage device 156.

In this embodiment, the management function 150 has a timer processing function 157, a transmission function 158, and a reception function 159. The timer processing function 157 has a required margin time calculating part 15b. The reception function 159, when it receives a request from the node device by a reception part 15a, notifies it to the required margin time calculating part 15b. The required margin time calculating part 15b calculates a required margin time. The calculated value is used in transmitting a packet to the node device, to which the notification is addressed, by a transmission part 15d within the transmission function 158.

Figure 14:
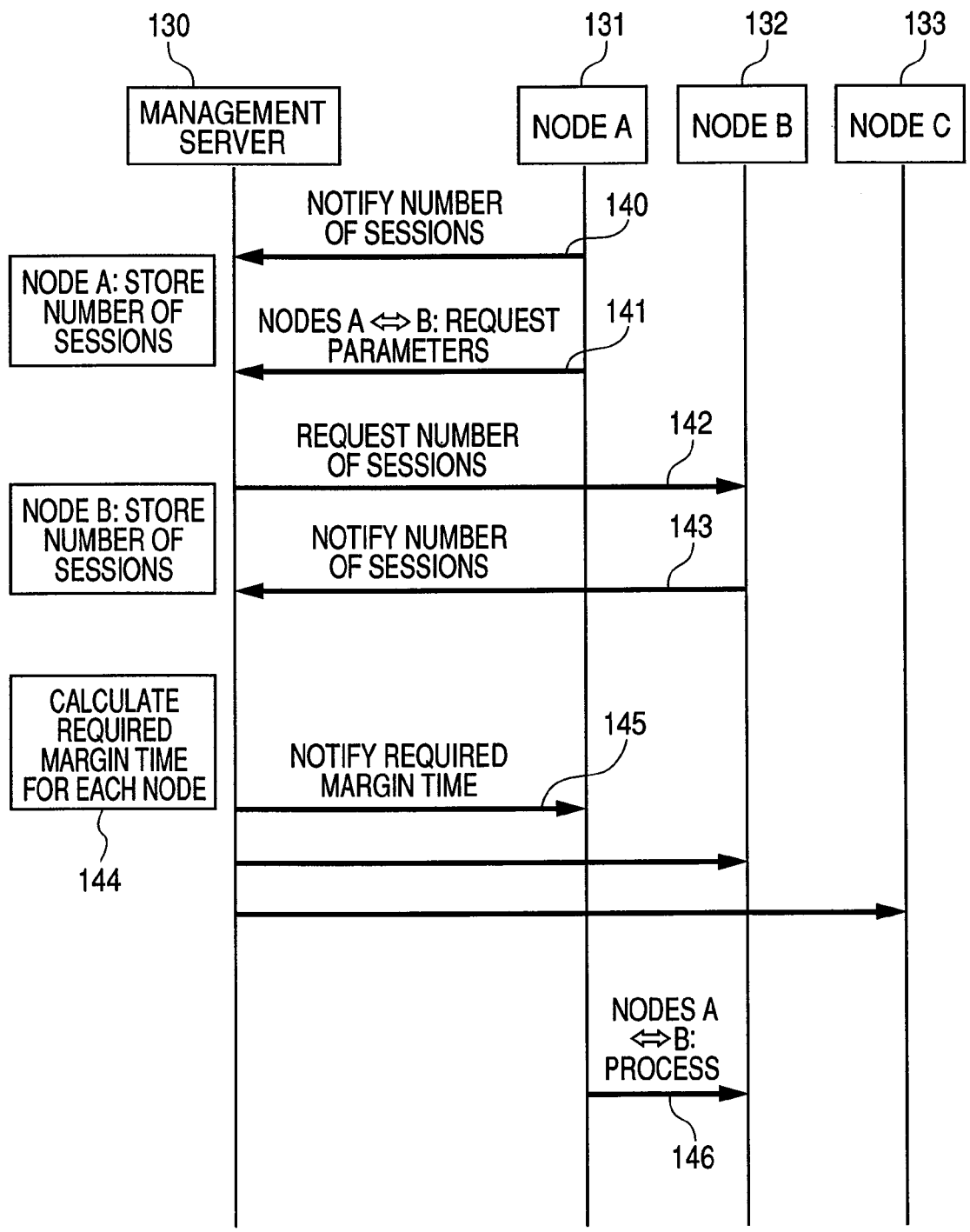
FIG. 14 is a sequence chart showing one example of formula of applying the required margin time by the management server in this embodiment.

FIG. 14 is a sequence chart showing one example of formula of determining and notifying the required margin time by the management server 130 in this embodiment.

The node A (131) for instance, before establishing a new session with the node B (132), transmits to the management server (130) a session number notification (140) including the number of sessions in the local device and a required margin time request (141) for use in a communication failure monitoring session to be established with the node B. Each node manages the number of sessions with the management session information part 7i for instance. The management server 130 stores for each node the number of sessions of the received node. The management server 130, when it has not acquired information (e.g. session information) on the node B or when it needs to acquire the latest information on the node B, acquires the number of sessions of the node B (142 and 143). A case in which it needs to acquire the latest information may be, for instance, one in which no notification on the number of sessions has been received from the node B for a period not shorter than a prescribed length of time. The management server 130 calculates for the node A and the node B their required margin times (Step 144). The corresponding required margin times are figured out by referencing the table 761 such as the one shown in FIG. 10 with the number of sessions of the nodes A and B as key information items (100 and 102). The required margin time may be similarly figured out for every node having established sessions with the node A or B.

The management server 130 transmits the required margin time to the nodes. The management server 130, when there is any variation in the value of the required margin time figured out at Step 144, not only for a new session but also for an existing session, notifies the pertinent node of the variation (145). The pertinent node in this context means, for instance, a node connected to the node A and/or the node B (e.g. the node C). Each node calculates the detection time by using the notified required margin time (146).

Each node, when the number of sessions it holds has varied, may similarly notify the management server and acquire a new required margin time. Or each node may periodically transmit the number of sessions to the management server 130 and acquire the required margin time. The management server 130 also notifies a new required margin time to the node (e.g. the node B) having established sessions with the node whose number of sessions has varied (e.g. the node A) when the required margin time varies.

Figure 16:
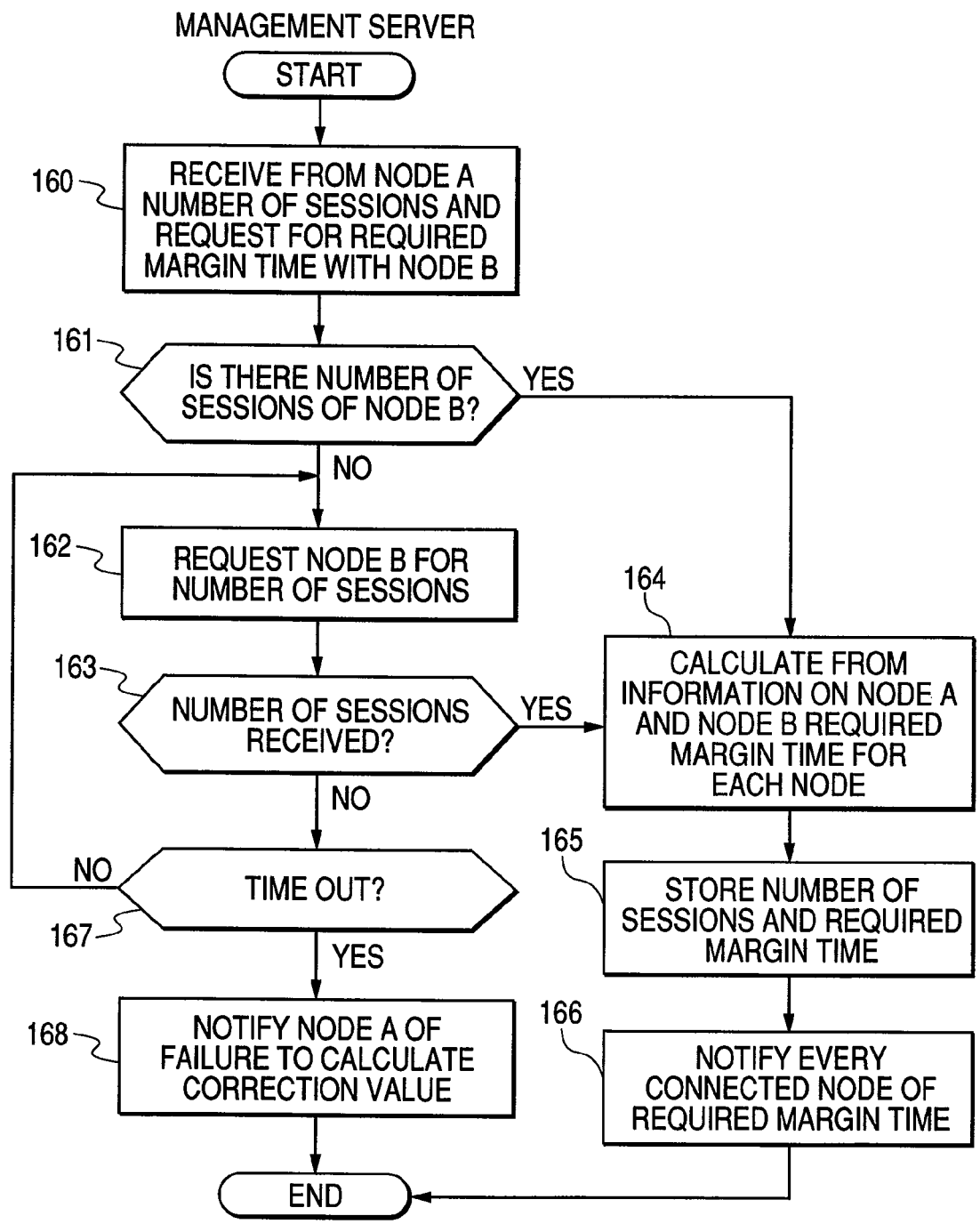
FIG. 16 is a flow chart showing one example of method of calculating the required margin time by the management server in this embodiment.

FIG. 16 is a flow chart showing one example of method of calculating the required margin time by the management server 130 in this embodiment.

The management server 130 receives a notification of the number of sessions transmitted when the node A establishes sessions with the node B and a request for the required margin time in the sessions with the node B (Step 160). The management server 130 checks whether or not information on the number of sessions of the node B is held (Step 161) and, if it is, shifts to Step 164. Or if it is not, the management server 130 requests the node B for the number of sessions (Step 162). When the number of sessions is notified from the node B (Step 163), the processing shifts to Step 164.

At Step 164, the management server 130 calculates the required margin time for use with every node connected to the node A and the node B (Step 164). The management server 130 stores the calculated required margin time (Step 165). The management server 130 notifies the required margin time to the node whose required margin time has varied (Step 166). Each node having received the required margin time performs processing of FIG. 8 by using the new required margin time to update the detection time.

The management server 130, if the number of sessions is not notified by the node B before the time runs out (Step 167), sends again the request for the number of sessions (Step 162). If there is no response when or after the time runs out (Step 167), the management server 130 deems the calculation of the required margin time to have failed and notifies the failure to the node A (Step 168). Or if it does not send again the request, the management server 130 waits until the time runs out and shifts to Step 168 after the timeout. When notified of the failure to calculate the corrected value, the node A may determine that the node B involves a problem and refrain from connection. Although only the number of sessions is used here as the key to calculation of the required margin time, a key combining the values of the transmission interval and reception interval of sessions may be used as well.

The four methods of determining the required margin time so far described may as well be used in any combination. For instance, both the second method and the third method described above may be executed, and the longer one of the detection times obtained may be determined as that for use in real operation. Other methods may be similarly combined, too. Or the second and third methods may be executed by using a management server, or the fourth method may be applied without using a management server and instead by having the node devices exchange information on the number of sessions to perform the processing otherwise accomplished by a management server.

As hitherto described, this embodiment makes it possible to avoid, in monitoring communication failure between nodes, erroneous detection of a delay as a communication failure while restraining the elongation of the detection time, when there is no problem on the route even though a delay has occurred on the communication path, by introducing a required margin time for correcting the detection time 5. Outline 5.1 Network System A network system according to the invention may be, for instance, a network system comprising a plurality of node devices, wherein:

each of the node devices is provided with a detection protocol for detecting any failure on a communication path;

the detection protocol:

transmits and receives packets to and from a remote node; and detects a failure when a packet is not received from the remote node after the elapse of a detection time; and the detection time has a detection time correcting function, whereby:

in a network system comprising node devices each of which is provided with a detection protocol having as reference a value obtained by negotiation with the remote node, correction for preventing erroneous detection is performed on the reference value and thereby the value to be applied to real operation is determined.

(Fixed Formula)

Correction of the detection time in this network system may be accomplished by adding a required margin time, which is given as a set value through hardware configurational definition or the like, to the remote transmission time, which is the packet transmission interval from the remote device to obtain a required detection time, comparing the reference value of the uncorrected detection time and the required detection time and selecting what is longer as the detection time to be applied to real operation.

(Load Measuring Formula)

Correction of the detection time in this network system may be accomplished by measuring the processing loads of the node devices, determining the required margin time from the loads in the node devices, adding the required margin time to the remote transmission time, which is the transmission interval of packets from the remote device, to obtain the required detection time, comparing the reference value of the uncorrected detection time and the required detection time and selecting what is longer as the detection time to be applied to real operation.

(Received Packet Measuring Formula)

Correction of the detection time in this network system may be accomplished by measuring the real reception intervals of packets from the remote node device, determining the required margin time from the average and variance of the reception intervals, adding the required margin time to the remote transmission time, which is the transmission interval of packets from the remote device, to obtain the required detection time, comparing the reference value of the uncorrected detection time and the required detection time and selecting what is longer as the detection time to be applied to real operation.

(Management Server Formula)

Another network system in this embodiment may, for instance, comprise a plurality of node devices provided with a detection protocol for detecting any failure on the communication path and a management server, wherein:

a node device A, when establishing connection with a remote node device B, notifies a management server that connection is to be established between the node device A and the remote node device B;

the management server having received the notification of connection figures out a required margin time for preventing erroneous detection on the basis of connected load information on each node device and notifies the node devices;

and the node devices have a detection time correcting function with which the detection time is corrected by using the required margin time notified from the management server.

(Required Margin Time Calculating Formula in Management Server)

The required margin time figured out by the management server in this network system may use values for which the table is searched with the number of sessions of the local node and the number of sessions of the remote node as key information.

(Table Setting Formula in Management Server)

Values in the table in the network system may be determined by setting by the server manager.

(Addressees of Required Margin Time Notification)

The addressees of the notification of the required margin time by the management server in this network system may be the node A, the node device B, and any node device connected to the two node devices.

(BFD)

As the detection protocol in this network system, Bidirectional Forwarding Detection (BFD) may be used, and a detection time reflecting the required margin time may be utilized.

5.2 Node Device

The node device in this embodiment may be, for instance, a node device provided with a detection protocol for detecting any failure on the communication path, wherein:

the detection protocol transmits packets to the remote node, a failure is detected when no packet is received from the remote node after the elapse of a detection time;

the detection time is provided with a detection time correcting function with which, in the node device provided with a detection protocol which references a value obtained by negotiation with the remote node, correction for preventing erroneous detection is performed on the reference value, and the detection time to be applied to real operation is determined.

(Fixed Formula)

Correction of the detection time in this node device may be accomplished by adding a required margin time, which is given as a set value through hardware configurational definition or the like, to the remote transmission time, which is the packet transmission interval from the remote device to obtain a required detection time, comparing the reference value of the uncorrected detection time and the required detection time and selecting what is longer as the detection time to be applied to real operation.

(Load Measuring Formula)

Correction of the detection time in this node device may be accomplished by measuring the processing loads of the node devices, determining the required margin time from the loads in the node devices, adding the required margin time to the remote transmission time, which is the transmission interval of packets from the remote device, to obtain the required detection time, comparing the reference value of the uncorrected detection time and the required detection time and selecting what is longer as the detection time to be applied to real operation.

(Received Packet Measuring Formula)

Correction of the detection time in this node device may be accomplished by measuring the real reception intervals of packets from the remote node device, determining the required margin time from the average and variance of the reception intervals, adding the required margin time to the remote transmission time, which is the transmission interval of packets from the remote device, to obtain the required detection time, comparing the reference value of the uncorrected detection time and the required detection time and selecting what is longer as the detection time to be applied to real operation.

(Management Server Formula)

Another node device in this embodiment may be provided with, for instance, a detection protocol for detecting any failure on the communication path, and connected by a management server and networks, wherein:

a node device A, when establishing connection with a remote node device B, notifies a management server that connection is to be established between the node device A and the remote node device B; and the node devices have a detection time correcting function with which the detection time is corrected by using the required margin time notified from the management server.

(BFD)

As the detection protocol in this node device, Bidirectional Forwarding Detection (BFD) may be used, and a detection time reflecting the required margin time may be utilized.

5.3 Management Server

The management server in this embodiment may be, for instance, connected to a plurality of node devices each provided with a detection protocol for detecting any failure on the communication path, the management server:

when a notification of starting failure monitoring between the node device to a remote node device is received, figures out a required margin time for preventing erroneous detection on the basis of connected load information on each node device and notifies it to the node devices.

(Required Margin Time Calculating Formula in Management Server)

The required margin time figured out by the management server may use values for which the table is searched with the number of sessions of the local node and the number of sessions of the remote node as key information.

(Table Setting Formula in Management Server)

Values in the table in the management server may be determined by setting by the server manager.

(Addressees of Required Margin Time Notification)

The addressees of the notification of the required margin time by the management server in this network system may be the node A, the node device B, and any node device connected to the two node devices.

5.4 Detecting Method

The detection formula (detection method) in this embodiment may be, for instance, a detection formula for detecting any communication failure between node devices connected by a network, whereby:

packets are transmitted and received to and from a remote node;

a failure is detected when a packet is not received from the remote node after the elapse of a detection time; and the detection time has a detection time correcting function, whereby:

in a network system comprising node devices each of which is provided with a detection protocol having as reference a value obtained by negotiation with the remote node, correction for preventing erroneous detection is performed on the reference value and thereby the value to be applied to real operation is determined.

(Fixed Formula)

Correction of the detection time by this detection formula may be accomplished by adding a required margin time, which is given as a set value through hardware configurational definition or the like, to the remote transmission time, which is the packet transmission interval from the remote device to obtain a required detection time, comparing the reference value of the uncorrected detection time and the required detection time and selecting what is longer as the detection time to be applied to real operation.

(Load Measuring Formula)

Correction of the detection time by this detection formula may be accomplished by measuring the processing loads of the node devices, determining the required margin time from the loads in the node devices, adding the required margin time to the remote transmission time, which is the transmission interval of packets from the remote device, to obtain the required detection time, comparing the reference value of the uncorrected detection time and the required detection time and selecting what is longer as the detection time to be applied to real operation.

(Received Packet Measuring Formula)

Correction of the detection time by this detection formula may be accomplished by measuring the real reception intervals of packets from the remote node device, determining the required margin time from the average and variance of the reception intervals, adding the required margin time to the remote transmission time, which is the transmission interval of packets from the remote device, to obtain the required detection time, comparing the reference value of the uncorrected detection time and the required detection time and selecting what is longer as the detection time to be applied to real operation.

(Management Server Formula)

Another detection formula in this embodiment, for instance, by which any failure on the communication path may be detected in node devices connected by a management server and networks, may have a detection time correcting function whereby:

when starting failure monitoring, a management server is notified that connection is to be established with the remote node device;

a required margin time for preventing erroneous detection is notified by the management server; and the detection time is corrected by using the required margin time.

(Required Margin Time Calculating Formula in Management Server)

The required margin time figured out by the management server according to this detection formula may use values for which the table is searched with the number of sessions of the local node and the number of sessions of the remote node as key information.

(Table Setting Formula in Management Server)

Values in the table by this detection formula may be determined by setting by the user.

(Addressees of Required Margin Time Notification)

The addressees of the notification of the required margin time by the management server according to this detection formula may be the node A, the node device B, and any node device connected to the two node devices.

(BFD)

As the detection protocol for use by this detection formula, Bidirectional Forwarding Detection (BFD) may be used, and a detection time reflecting the required margin time may be utilized.

The detection time correcting formula according to the invention can be utilized not only for monitoring of a communication path between routers where high speed detection of communication failure is required but also as a technique of avoiding erroneous detection due to a communication delay in communication equipment in general which performs monitoring according to communication time out, as in the case of a server. The invention can also prove useful for industries which, for instance, use communication failure detection systems, node devices having a communication failure detecting function or require detection time correction to prevent erroneous detection of route failure due to a communication delay.

What is claimed is:

1. A network system having a plurality of node devices, wherein each of the node devices is provided with a detection part for detecting any failure on a route to an opposite node device;
    wherein the detection part of a first node device determines a transmission interval of a packet for fault detection based on a negotiation result with an opposite second node device; receives a packet for fault detection transmitted from the second node device; and detects a failure on the route to the second node device based on a failure to receive the packet from the second node device after the elapse of a determined detection time; and
    wherein the detection time is determined by the detection part of the first node device which determines a first detection time based on the transmission interval of the packet determined by negotiation with the second node device, determines a second detection time by adding a margin time, either preset or pre-calculated, to a predicted value of a real transmission interval at which the packets are actually transmitted based on the transmission interval of the packets determined by negotiation with the second node device; compares the first detection time and the second detection time and determines which has a longer value as the detection time to be applied to real operation.

2. The network system according to claim 1, wherein:
    the second detection time is determined by the detection part which adds the margin time provided in advance as a set value to the transmission interval of the packets determined by negotiation or the predicted value of a real transmission interval at which the packets are actually transmitted based on the transmission interval.

3. The network system according to claim 1, wherein:
    the second detection time is determined by the detection part which measures the load of the local node device; determines the margin time on the basis of the measured load in the local node device; and adds the margin time to the transmission interval of the packets determined by negotiation or the predicted value of a real transmission interval at which the packets are actually transmitted based on the transmission interval.

4. The network system according to claim 3,
    wherein the node device is further provided with a table in which the margin times are stored in advance corresponding to an average and variance of loads of the local node device,
    wherein the detection part measures the average and variance of loads containing either a CPU load of the local node device or a difference between an actual execution period of a periodically operating processing part and a set period; and references the table on based on the average and variance of the measured loads to determine the corresponding margin time.

5. The network system according to claim 3, wherein:
    the detection part regularly or irregularly measures loads in the local node device a plurality of times; where the margin time determined on the basis of the measured loads has varied from the margin time last determined, determines the second detection time again on the basis of the margin time newly determined; and determines the detection time again.

6. The network system according to claim 1, wherein:
    the second detection time is determined by the detection part which measures reception intervals of the packets from the remote node device and an average and variance of the reception intervals; determines the margin time on the basis of the average and variance of the measured reception intervals; and adds the margin time so determined to the transmission interval of the packets determined by negotiation or the predicted value of the real transmission interval at which the packets are actually transmitted based on the transmission interval.

7. The network system according to claim 6,
    wherein the node device is further provided with a table in which the margin times are stored in advance corresponding to the average and variance of the reception intervals of the packets; and
    wherein the detection part references the table on the basis of the average and variance of the measured reception intervals to determine the corresponding margin time.

8. The network system according to claim 6, wherein:
    the detection part regularly or irregularly measures the average and variance of the reception intervals of the packets from the remote node device a plurality of times; where the margin time determined on the basis of the measured average and variance of the reception intervals has varied from the margin time determined in the past, determines the second detection time again on the basis of the margin time newly determined; and determines the detection time again.

9. The network system according to claim 1, further comprising:
    a management server which communicates with each of the first and second node devices,
    wherein the first node device, when establishing connection with the opposite second node device, notifies the management server that the first node device and the opposite second node device are to be connected;
    wherein the first and second node devices transmit to the management server connected load information on respective local devices;
    wherein the management server having received the notification determines a margin time on the basis of connected load information received from the first and second node devices, and transmits the margin time to the first and second node devices; and
    wherein the first and second node devices determine the second detection time by using the margin time received from the management server.

10. The network system according to claim 9, wherein the connected load information is the number of sessions of the first or second node device;
    wherein the management server has a table in which margin times are stored in advance corresponding to the number of sessions of the first node device and the number of sessions of the second node device; and
    wherein the corresponding margin times are acquired by searching the table on the basis of the number of sessions of the first node device and the number of sessions of the second node device that have been received, and the acquired margin times are transmitted to the first and second node devices.

11. The network system according to claim 1, wherein:
the detection part detects any failure by using a Bidirectional Forwarding Detection (BFD) protocol and using a detection time which reflects the margin time.

12. The node device in a network system comprising a plurality of node devices,
wherein the node device is provided with a detection part for detecting any failure on the route to a remote node device;
wherein the detection part determines a transmission interval of a packet for fault detection based on a negotiation result with the remote node device; receives a packet for fault detection transmitted from the remote node device; and detects a failure on the route to the remote node device based on a failure to receive the packet from the remote node device after the elapse of a determined detection time; and
wherein the detection time is determined by the detection part which determines a first detection time based on the transmission interval of the packet determined by negotiation with the remote node device, determines a second detection time by adding a margin time, either preset or pre-calculated, to a predicted value of a real transmission interval at which the packets are actually transmitted based on the transmission interval of the packets determined by negotiation with the second node device; compares the first detection time and the second detection time and determines which has the longer value as the detection time to be applied to real operation.

13. The node device according to claim 12, wherein:
the second detection time is determined by the detection part which adds the margin time provided in advance as a set value to the transmission interval of the packets determined by negotiation or the predicted value of a real transmission interval at which the packets are actually transmitted based on the transmission interval.

14. The node device according to claim 12, wherein:
the second detection time is determined by the detection part which measures the load of a local node device; determines a margin time on the basis of the measured load in the local node device; and adds the margin time so determined to the transmission interval of the packets determined by negotiation or the predicted value of a real transmission interval at which the packets are actually transmitted based on the transmission interval.

15. The node device according to claim 12, wherein:
the second detection time is determined by the detection part which measures reception intervals of the packets from the remote node device and an average and variance of the reception intervals; determines the margin time on the basis of the average and variance of the measured reception intervals; and adds the margin time so determined to the transmission interval of the packets determined by negotiation or the predicted value of the real transmission interval at which the packets are actually transmitted based on the transmission interval.

16. The node device according to claim 12,
wherein the detection part, when establishing connection with the remote node device, notifies a management server that connection is to be established with the remote node device;
wherein connected load information on the local device is transmitted to the management server;
wherein a margin time requested and transmitted by the management server is received on the basis of the connected load information and connected load information on the remote node device; and
wherein the second detection time is figured by using the received margin time.

17. The node device according to claim 12, wherein:
the detection part detects any failure by using a Bidirectional Forwarding Detection (BFD) protocol and using a detection time which reflects the margin time.

18. A management server in a network system comprising first and second node devices and the management server,
wherein the first node device determines as a detection time either a first detection time based on a transmission interval of packets for fault detection determined by a negotiation result with the second node device or a second detection time involving the addition of a margin time received from the management server to a predicted value of the real transmission interval at which the packets are actually transmitted based on the transmission interval of the packets determined by negotiation with the second node device, and a failure on the route to the second node device is detected by a failure to receive the packet from the second node device after the elapse of the detection time,
wherein the management server has a table in which margin times are stored in advance corresponding to connected load information on the first node device and connected load information on the second node device;
wherein a notification that connection is to be established between the first node device and the second node device is received from the first node device;
wherein connected load information on the first and second node devices is received from the respective devices;
wherein the corresponding margin times are acquired by searching the table on the basis of connected load information received from the first and second node devices, and the margin times are transmitted to the first and second node devices; and
wherein the second detection time is determined by the first and second node devices by using the margin times.

* * * * *